United States Patent [19]
Yamada et al.

[11] Patent Number: 5,685,986
[45] Date of Patent: Nov. 11, 1997

[54] ADSORBENT BODY INCLUDING ACTIVATED CARBON AND INORGANIC BINDER FOR BONDING TOGETHER ACTIVATED CARBON GRAINS, AND METHOD OF PRODUCING THE ADSORBENT BODY

[75] Inventors: Takao Yamada; Kazuhito Tsumuki, both of Aichi-ken, Japan

[73] Assignee: Noritake Co., Ltd., Aichi-ken, Japan

[21] Appl. No.: 577,247

[22] Filed: Dec. 22, 1995

[30] Foreign Application Priority Data

Dec. 26, 1994 [JP] Japan .................................. 6-321961

[51] Int. Cl.$^6$ .............................. B01D 39/00; B01J 20/20; C01B 31/08
[52] U.S. Cl. ................... 210/496; 210/502.1; 210/503; 210/504; 210/510.1; 156/89; 264/122
[58] Field of Search ............................. 210/502.1, 510.1, 210/496, 503, 504, 505; 156/89; 264/122

[56] References Cited

U.S. PATENT DOCUMENTS 4,518,704  5/1985  Okabayashi et al. .

FOREIGN PATENT DOCUMENTS

| | | |
|---|---|---|
| 0 343 697 A1 | 11/1989 | European Pat. Off. . |
| 0 369 171 A1 | 5/1990 | European Pat. Off. . |
| 283 269 A7 | 10/1990 | Germany . |
| A-51-037091 | 3/1976 | Japan . |
| A-53-045689 | 4/1978 | Japan . |

*Primary Examiner*—David A. Reifsnyder
*Attorney, Agent, or Firm*—Oliff & Berridge

[57] ABSTRACT

An adsorbent body having a porous structure for purifying a fluid, wherein the porous structure comprises activated carbon, and an inorganic binder for bonding together grains of the activated carbon. The porous structure optionally comprises activated alumina. The adsorbent body is produced by: preparing a raw material composition including a source material which gives activated carbon, aluminum hydroxide which gives activated alumina ($Al_2O_3$), and an inorganic binder for bonding together grains of the activated carbon and the activated alumina; forming an unfired shaped body of the raw material composition; and firing the unfired shaped body at a predetermined sintering temperature to produce the adsorbent body.

11 Claims, 2 Drawing Sheets

ADSORBENT BODY INCLUDING ACTIVATED CARBON AND INORGANIC BINDER FOR BONDING TOGETHER ACTIVATED CARBON GRAINS, AND METHOD OF PRODUCING THE ADSORBENT BODY

BACKGROUND OF THE INVENTION

1. Field of the Invention

The present invention relates to improvements in an adsorbent body for purifying or refining a gas or liquid or separating a substance from a fluid, and a method of producing such an adsorbent body.

2. Discussion of the Prior Art

There is known an adsorbent body used for purification or refinement of a gas or liquid, and separation of a given substance contained in a fluid. Examples of such an adsorbent body include activated carbon, synthetic zeolite, silica gel, and naturally activated rocks. Of these adsorbent materials, the activated carbon in particular has a comparatively high ability of adsorption and is widely used as a deodorant and a water purifier, for instance.

Activated carbon is produced by activating an amorphous carbon (i.e., turbostratic structure wherein carbon molecules are not regularly three-dimensionally arranged), which is included in sufficiently carbonized wood (plants), lignite (brown coal), peat (turf), etc. The activation of the amorphous carbon may be achieved by heat-treating with a water vapor a starting material which includes the amorphous carbon, or by caronizing the starting material by impregnating the starting material with an aqueous solution of zinc chloride, phosphate or other activating agent. The thus produced activated carbon has a porous structure of amorphous carbon having an enormous number of fine pores, which has a high ability of adsorption.

Generally, the activated carbon takes a powdered or granular form, and is packed in a suitable container when it is used as an adsorbent. The container is placed at a desired location of use, for example, in a refrigerator or a water purifier. The activated carbon can be used without a problem where the rate of flow of a fluid (e.g., air or water) at the location of use is relatively low as in a refrigerator or water purifier. However, the granules or grains of the activated carbon may scatter around the container or flow into the fluid, where the rate of the fluid flow at the location of use of the activated carbon is relatively high as in a filter of an air conditioner or in a filter of a continuously useable bath (so-called "24-hour bath"). Where the fluid flow rate at the location of use is high, therefore, the activated carbon is usually used in the form of pellets each functioning as an adsorbent Body, in order to prevent the above-problem of scattering or flow of the carbon grains. In this case, the pellets may suffer from easy chipping or breakage, since the activated carbon which is a carbonaceous porous has a relatively low mechanical strength and since the pellets is subject to a pressure of the fluid may collide with each other during use. Such chipping of the pellets causes the carbon grains to be removed from the pellets, leading to similar problem of scattering or flow of the removed grains at the location of use.

The adsorbent body such as a pellet used at a location where the fluid flow rate is high is required to have a collapse strength of at least 7 kg/pellet, which is considerably higher than a normal collapse strength of a porous structure of an adsorbent material. That is, the collapse strength of activated carbon is as low as about 1–3 kg/pellet. Accordingly, an adsorbent body of activated carbon or other highly adsorbent material cannot be conventionally used at a location where a fluid to which the adsorbent body is exposed has a high rate of flow. For such application, therefore, the known adsorbent body uses a naturally activated rock whose adsorption ability is lower than that of the activated carbon. Although the adsorption ability or function increases with an increase in the porosity of the adsorbent body, the mechanical strength is undesirably lowered with an increase in the porosity of the absorbent body. Thus, the adsorption ability and the mechanical strength are not easily compatible in the prior art.

SUMMARY OF THE INVENTION

It is therefore a first object of the present invention to provide an adsorbent body which not only has a mechanical strength sufficient for use at a location where the rate of a fluid flow is relatively high, but also has a sufficiently high ability of adsorption.

It is a second object of this invention to provide a method suitable for producing such an adsorbent body.

According to one aspect of this invention, there is provided an adsorbent body having a porous structure for purifying a fluid, wherein the porous structure comprises activated carbon and an inorganic binder for bonding together grains of the activated carbon.

The porous structure of the adsorbent body constructed according to the present invention comprises activated carbon has a sufficiently high adsorption ability owing to a multiplicity of pores formed in the activated carbon. Further, since the grains of the activated carbon are firmly bonded together by the inorganic binder, the mechanical strength of the present adsorbent body is significantly increased as compared with that of the known activated carbon which does not include an inorganic binder. Thus, the adsorbent body according to the present invention has a sufficiently high mechanical strength as well as a sufficiently high adsorption ability.

Preferably, the porous structure of the adsorbent body further comprises activated alumina ($Al_2O_3$). In this case where the porous structure comprises activated alumina which also has an excellent adsorption ability, two different kinds of adsorbates (substances to be adsorbed) may be suitably adsorbed by the porous structure. That is, the single kind of adsorbent body is capable of separating or refining two different substances contained in a subject fluid. Accordingly, an adsorbent device using the same absorbent bodies may be simplified and is available at a reduced cost. The activated alumina has a considerably low mechanical strength, and the use of the activated alumina together with the activated carbon reduces the overall mechanical strength of the adsorbent body, as compared with that of the adsorbent body which comprises only the activated carbon. However, the inorganic binder functions to firmly bond the grains of the activated alumina, as well as the grains of the activated carbon. Consequently, the adsorbent body comprising both the activated carbon and the activated alumina adsorbates exhibits a sufficiently high overall mechanical strength, while having two groups of adsorption sites corresponding to the activated carbon and alumina. The adsorption site is interpreted to mean a surface portion on which molecules of a substance are adsorbed as an adsorbate. For dealing with two kinds of adsorbates having different properties, the adsorbent body is generally required to have respective two groups of adsorption sites.

As indicated above, the adsorbent body may be used as a water purifier for the so-called "24-hour bath", for maintaining hot water in the bath in a clean state. The hot water in the bath usually contains various kinds of contaminants such as organic components, fatty acids, ammonia and other substances derived from human bodies, and alkali salts of higher fatty acids derived from soaps. The activated carbon has an excellent adsorption ability or force with respect to coloring matters or pigments (i.e., the decoloring power with respect to Methylene Blue), but has a poor adsorption ability with respect to polar substances such as ammonia nitrogen. Therefore, a conventional purifier requires at least two kinds of adsorbent bodies using respective different adsorbent materials (e.g., activated rock in addition to activated carbon). Since these different adsorbent materials have different mechanical strength values, the adsorbent body of the adsorbent material having the lower mechanical strength is apt to be collapsed or destroyed by the adsorbent body of the adsorbent material having the higher mechanical strength, where these two different adsorbent bodies are used in the same container. Consequently, the conventional purifier requires two or more containers corresponding to the respective kinds of the adsorbent materials, which containers are arranged in series or in parallel. According to the above-indicated preferred form of the present invention, on the other hand, the single adsorbent body comprises the activated carbon and alumina which provide respective groups of adsorption sites, and a suitable number of the same adsorption bodies are accommodated in a single container. Accordingly, the purifying device is simplified and is available at a comparatively low cost.

It is noted that the decoloring power with respect to Methylene Blue indicated above may be measured according to JIS (Japanese Industrial Standards), K1426, by using, for example, a measuring apparatus 28 as illustrated in FIG. 5. The measuring apparatus 28 includes a refining or separating device 22 in which adsorbent bodies are accommodated in a container, a liquid bath 24 which is connected to the device 22 and is filled with an aqueous solution of Methylene Blue, and a pump 26 for circulating the solution through the device 22. The concentration and volume of the aqueous solution of Methylene Blue solution, the total amount of the adsorbent in the device 22, and the rate of circulation of the aqueous solution are suitably adjusted. The Methylene Blue decoloring power of the adsorbent bodies can be measured by indirect analysis of the amount of adsorption of Methylene Blue per unit time, by analyzing the aqueous solution in the bath 24 by absorptiometry (absorptiometric method or absorption photometry).

According to another preferred form of this invention, the inorganic binder comprises a clay mineral such as a silica.alumina clay mineral. The inorganic binder may include phosphorus pentaoxide ($P_2O_5$) in place of or in addition to other inorganic binder material such as the clay mineral. The phosphorus pentaoxide promotes the bonding of the grains Of the activated carbon (and the activated alumina according to the above preferred form of the invention), at a comparatively low heat-treatment or sintering temperature. In other words, a sufficient bonding force or power can be obtained by the inorganic binder before substantial gasification of the activated carbon and before substantial sintering of the activated alumina and inorganic bonder. This is effective to prevent deterioration of the adsorption ability of the activated carbon and alumina, and therefore contributes to an improvement in the adsorption performance of the adsorbent materials. In this respect, it is noted that phosphorus pentaoxide is conventionally used in a phosphate curing process in which phosphorus pentaoxide is added to a refractory material to induce heating and curing, for producing a non-fired refractory, as disclosed in CHEMICAL INDUSTRY, October 1975, P81–90 (in Japanese). In the present invention, the use of phosphorus pentaoxide included in the inorganic binder appears to promote the bonding of the adsorbent grains as in the phosphate curing process.

In a further preferred form of the invention, the porous structure of the adsorbent body comprises 5–40 wt. % of activated carbon, 10–40 wt. % of activated alumina, and 1–15 wt. % of phosphorus pentaoxide. If the content of the activated carbon is smaller than the lower limit of 5 wt. % or if the content of the activated alumina is smaller than the lower limit of 10 wt. % the adsorbent body does not have a sufficient adsorption ability. If the content of the activated carbon is larger than the upper limit of 40 wt. %, the formability of a raw material composition to form the adsorbent body and the property to maintain the shape of the formed body are deteriorated. If the content of the activated alumina is greater than the upper limit of 40 wt. %, the strength of the fired adsorbent body is considerably lowered. For promoting the bonding, the content of phosphorus pentaoxide should be 1 wt. % or larger. If the content of phosphorus pentaoxide is greater than the upper limit of 15 wt. % the adsorption ability of the activated carbon (and activated alumina) is lowered.

According to a second aspect of this invention, there is provided a method of producing an adsorbent body having a porous structure for purifying a fluid, the method comprising: preparing a raw material composition including a source material which gives activated carbon, aluminum hydroxide which gives activated alumina, and an inorganic binder for bonding together grains of the activated carbon and the activated alumina; forming an unfired shaped body of the raw material composition; and firing the unfired shaped body at a predetermined sintering temperature to produce the adsorbent body.

In the present method, the raw material composition includes aluminum hydroxide which gives activated alumina, and aluminum hydroxide is thermally decomposed to produce the activated alumina upon firing of the unfired shaped body at the predetermined sintering temperature. Therefore, the produced adsorbent body has not only an adsorption ability based on the activated carbon, but also an adsorption ability based on the activated alumina, thus exhibiting an excellent overall adsorption ability. Further, a water vapor generated upon thermal decomposition of aluminum hydroxide also functions to activate carbon (activated carbon or amorphous carbon) included in the shaped body, thereby increasing the number of fine pores within the fired adsorbent body, and further improving the adsorption ability of the adsorbent body.

In one preferred form of the method according to the second aspect of the present invention, the row material composition includes 15–70 wt. % of aluminum hydroxide. For enabling the adsorbent body to include at least 10 wt. % of activated alumina contributing to an increase in the overall adsorption ability, the content of aluminum hydroxide should be 15 wt. % or more. For preventing the activated alumina content from exceeding the upper limit of 40 wt. % and reducing the strength of the fired adsorbent body, the content of the aluminum hydroxide should not exceed 70 wt. %.

Preferably, the unfired shaped body of the raw material composition is fired at a temperature of 500°–1000° C. in an atmosphere whose oxygen concentration is substantially zero. In this case, the gasification of the carbon in the shaped body (which causes generation of carbon dioxide) is restricted in the absence of oxygen, permitting a larger amount of activated carbon to remain in the fired absorbent body, than in a case where the firing is effected in an oxidizing atmosphere. If the sintering temperature is lower than 500° C., the aluminum hydroxide cannot be sufficiently thermally decomposed, and the inclusion of the aluminum hydroxide does not increase the overall adsorption ability of the fired absorbent body. Further, the inorganic binder does not achieve the desired bonding function at the sintering temperature lower than the lower limit of 500° C. If the sintering temperature exceeds the upper limit of 1000° C., the activated alumina is changed into dense α-alumina, and the use of aluminum hydroxide would not provide the intended result. Further, at the sintering temperature exceeding 1000° C., the carbon is gasified into carbon dioxide (carbonic acid gas), and the amount of activated carbon left in the fired absorbent body is reduced, while the inorganic binder is sintered with a result of densifying the adsorbent body, causing a decrease in the specific surface area and a consequent decrease in the adsorbent surface.

The source material which gives the activated carbon preferably comprises an ash of plant and/or wood which has a given content of carbon. In this case, a portion of the activated carbon which is derived from the plant/wood ash has a comparatively large number of fine pores owing to the ash. Consequently, the adsorbent body using an ash of plant and/or wood has a relatively increased number of fine pores, and an accordingly increased absorption ability. In the present application, the "ash of plant and/or wood" is interpreted to mean an ash obtained by incinerating various plants and/or trees such that carbon remains at predetermined ratios. It will be understood that the ash of plant and/or wood includes a malt ash and ashes of other grains. The content of organic substances in the ash of plant and/or wood varies depending upon the condition in which the ash is obtained by incineration or combustion. In the present invention, the plant/wood ash preferably includes a few or several percent of carbon, and more preferably includes a few or several tens of percent of carbon.

In the above arrangement in which the source material for activated carbon includes an ash of plant and/or wood, the content of this ash is preferably within a range of 4–70 wt. % with respect to the total amount of the raw material composition.

Preferably, the ash of plant and/or wood comprises 10–30 wt. % of carbon and 10–40 wt. % of phosphorus pentaoxide. In this case, the carbon (amorphous carbon or activated carbon) included in the ash of plant and/or wood gives the raw material composition a sufficient or suitable amount of carbon. Further, the ash gives the raw material composition phosphorus pentaoxide and also functions as part of the inorganic binder. Thus, the use of the plant/wood ash permits the absorbent body to have an increased mechanical strength without lowering its adsorption ability. The use of phosphorus pentaoxide in the form of the plant/wood ash is advantageous over the use of an aqueous solution of phosphorus pentaoxide or aluminum phosphate as in the conventional phosphate curing process, since phosphorus pentaoxide provided by the ash only slowly reacts with other components or constituents of the inorganic binder. In this respect, the production process of the adsorbent body can be easily controlled. Described more specifically, the phosphorus pentaoxide included in the ash of plant and/or wood has already reacted with various other inorganic components such as $SiO_2$, CaO and MgO also included in the ash, upon incineration or combustion of plants and/or trees to produce the ash. This is considered to be a reason for slow reaction of the phosphorus pentaoxide included in the ash with the other components of the inorganic binder.

An ash of grains is preferably used as the ash of plant and/or wood, since the content of phosphorus pentaoxide in this plant/wood ash is relatively high. In particular, a malt ash is desirably used as the grain ash. The malt ash is obtained by incinerating a beer-cake (a sludge or residue left after filtering of a barley liquid) produced in the production of beer. The malt ash contains various inorganic components including phosphorus pentaoxide which are derived from barley malt, and further contains a considerable amount of carbon (amorphous or activated). The use of the malt ash as the source materials for the activated carbon and inorganic binder is desirable from several standpoints, namely, disposal of the malt ash which is otherwise an industrial waste, saving of the resources, and improvement of the environment. Preferably, the malt ash comprises 10–30 wt. % of carbon (C), 30–50 wt. % of silicon dioxide ($SiO_2$), 1–3 wt. % of di-iron trioxide ($Fe_2O_3$), 3–8 wt. % of calcium oxide (CaO), 5–10 wt. % of magnesium oxide (MgO), 1–5 wt. % of potassium oxide ($K_2O$), and 10–40 wt. % of phosphorus pentaoxide ($P_2O_5$).

BRIEF DESCRIPTION OF THE DRAWINGS

The above and optional objects, features, advantages and technical significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
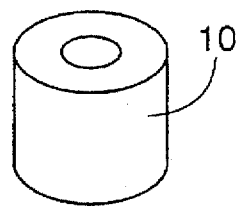
FIG. 1 is a perspective view showing an adsorbent body according to one embodiment of this invention.
Figure 2A:
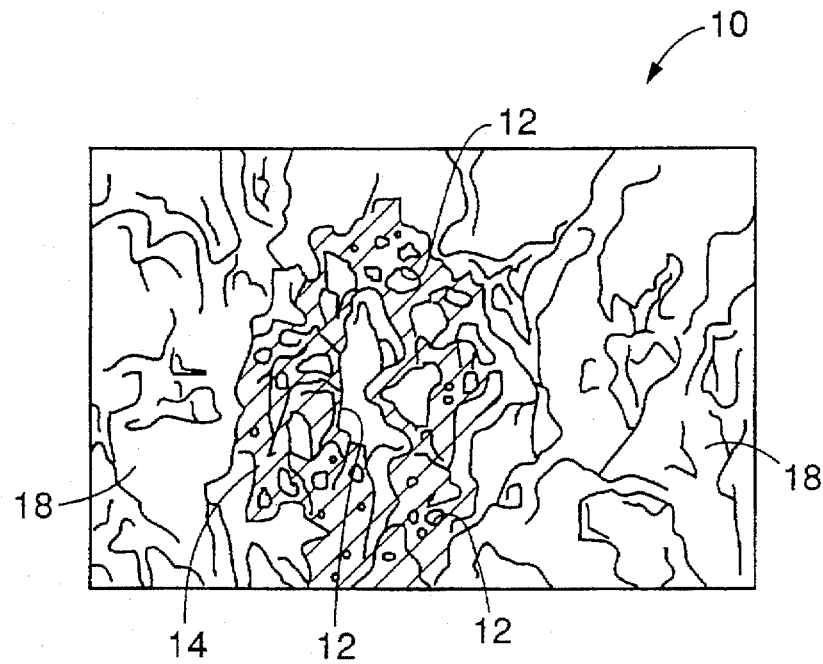
FIG. 2(a) is a view in approximately 1000-times enlargement showing a surface of the adsorbent body of FIG. 1.
Figure 2B:
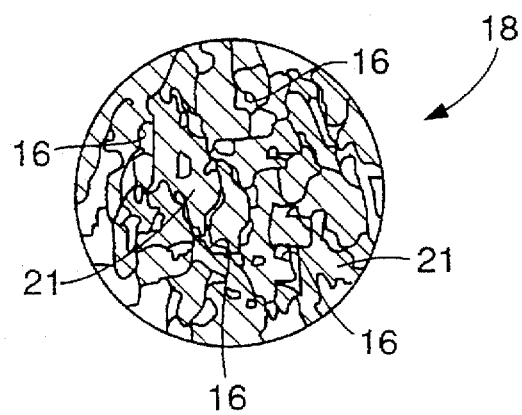
FIG. 2(b) is a view in approximately 1000-times enlargement showing activated alumina which constitutes a part of the structure of the adsorbent body of FIG. 1.

Referring first to FIG. 1, reference numeral 10 denotes an adsorbent body constructed according to one embodiment of the present invention, which is shown in approximately 1000-times enlargement in FIGS. 2(a) and 2(b). For example, the adsorbent body 10 is a black porous body in the form of a Raschig ring (a cylinder whose diameter and height are equal to each other), having an outside diameter of 8 mm, an inside diameter of 3 mm and a height of 8 mm. As shown in FIG. 2(a), the adsorbent body 10 has a porous structure including as major components activated carbon 14 having comparatively deep fine pores 12, and activated alumina 18 which has fine pores 16 formed at grain boundaries of alumina crystals 21. These activated carbon 14 and activated aluminum 18 take a powdered form having a comparatively small force of bonding between the grains, and the grains are firmly bonded together by a suitable inorganic binder (not shown) which includes silica ($SiO_2$) and alumina included in clay minerals.

A multiplicity of such adsorbent bodies 10 is accommodated in a cylindrical, prismatic or other suitably-shaped container, and is used in a device for separation or refinement. Namely, a fluid such as a gas or liquid is introduced into the container so as to flow therethrough, so that an appropriate adsorbate such as a coloring matter (pigment) or an organic substance contained in the fluid is adsorbed on the surfaces of the pores 12, 16, and is thus obtained as impurities or a useful substance. In other words, the adsorbent bodies 10 are used for separating a desired substance from a fluid or refining or purifying the fluid..

There will be described a method of producing the adsorbent body 10.

Initially, a raw material composition indicated below was prepared. To the raw material composition, there were added, as forming and/or bonding aids, 1.5 wt. % of a cellulose caking additive (such as CMC or MC, namely, carboxymethyl cellulose or methyl cellulose, or microcrystal cellulose), 5 wt. % of wax emulsion, and 5 wt. % of deflocculating agent such as stearic acid, per 100 wt. % of the raw material composition. The aqueous content of the

| Raw Material Composition | Content (wt. %) |
| --- | --- |
| "Honyama" clay (available in Japan) | 33 |
| Aluminum hydroxide [$Al(OH)_3$] (about purity: 99.4–99.7%) | 34 |
| Malt ash | 33 |

| Composition | Content (wt. %) |
| --- | --- |
| C | 24.10 |
| $SiO_2$ | 33.71 |
| $TiO_2$ | 0.02 |
| $Al_2O_3$ | 0.09 |
| $Fe_2O_3$ | 1.23 |
| CaO | 5.64 |
| MgO | 8.43 |
| $K_2O$ | 3.05 |
| $Na_2O$ | 0.27 |
| MnO | 0.16 |
| $P_2O_5$ | 22.83 | entire mixture (raw material composition and forming and/or bonding aids) was adjusted to be 24 wt. %. The raw material composition and the forming and/or bonding aids added thereto were mixed by a kneader, and the mixture was introduced into an extruder to form an unfired shaped body in the form of a Raschig ring which has an outside diameter of 8 mm, an inside diameter of 3 mm and a height of 8 mm. This unfired shaped body was dried at a temperature of 60°–180° C. for a period of 1–3 hours, and was then fired or sintered at a temperature of 900° C. for three hours in an oxidizing atmosphere. Thus, the adsorbent body 10 was produced.

In the present example, the method of producing the absorbent body 10 includes a step of preparing the raw material composition, a step of extruding the mixture of the raw material composition and the forming and/or bonding aids to form an unfired shaped body, and a step of firing the unfired shaped body to produce the absorbent body 10.

The "Honyama" clay included in the raw material composition is a silica.alumina clay mineral, and constitutes a major part of an inorganic binder for bonding together the grains of the activated carbon 14 and the activated alumina 18. The inorganic binder is not limited to the "Honyama" clay, but may be provided by various other clay minerals or by refined materials such as alumina. The aluminum hydroxide and the malt ash also included in the raw material composition are source materials which give the activated alumina 18 and the activated carbon 14, respectively. The malt ash also serve as part of the inorganic binder, as described below. The caking additive and other forming or bonding aids indicated above are organic compounds, which also serve as the source material which gives the activated carbon 14.

The composition and properties of the adsorbent body 10 produced as explained above are indicated in column [A] in TABLE 1 below. Although the present adsorbent body 10 according to Example [A] has a sufficiently large specific surface area, it has a sufficiently high collapse strength. The specific surface area was measured by BET (Brunauer-Emmett-Teller) adsorption method. The specific surface area is a surface area per unit weight. The adsorbent surface area and the adsorption ability of the adsorbent body 10 increase with an increase in the specific surface area. Legend "OPEN" in the row of "SINTERING" means that the sintering of the unfired shaped body of the raw material composition was effected in an oxidizing atmosphere. Legend "CLOSED" means that the sintering was effected in a non-oxidizing atmosphere in a closed vessel or furnace, namely, in an atmosphere whose oxygen concentration

TABLE 1

| SINTERING | ATMOSPHERE TEMP. (°C.) | [A] OPEN 900 | [B] CLOSED 800 | [C] OPEN 800 | [D] OPEN 700 |
| --- | --- | --- | --- | --- | --- |
| COMPOSITION OF ADSORBENT BODY 10 (wt. %) | C | 6.7 | 23.0 | *1 | *1 |
| | $SiO_2$ | 33.0 | 28.0 | | |
| | $TiO_2$ | 0.29 | 0.21 | | |
| | $Al_2O_3$ | 42.0 | 34.0 | | |
| | $Fe_2O_3$ | 1.3 | 0.99 | | |
| | CaO | 1.9 | 1.6 | | |
| | MgO | 3.4 | 2.9 | | |
| | $K_2O$ | 1.8 | 1.4 | | |
| | $Na_2O$ | 0.26 | 0.24 | | |
| | MnO | 0.06 | 0.05 | | |
| | $P_2O_5$ | 8.7 | 7.1 | | |
| PROPERTIES | | | | | |
| SPECIFIC SURFACE AREA ($m^2$/g) | | 20 | 80 | 35 | 70 |
| COLLAPSE STRENGTH (kg) | | 6.5 | 8.0 | 6.5 | 6.0 |

Figure 3:
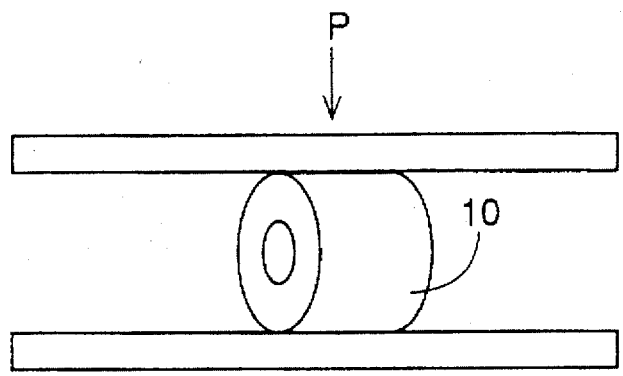
FIG. 3 is a view for explaining a method of measuring a collapse strength of the adsorbent body of FIG. 1.

*1: The composition is substantially the same as that of the adsorbent body according to Example [A].

is substantially zero. The collapse strength is a force or load P which was applied to the adsorbent body 10 in the radial direction as indicated in FIG. 3 and which caused collapse of the adsorbent body 10.

TABLE 1 also indicates the composition and properties of adsorbent bodies 10 according to Examples [B], [C] and [D], which were produced under different sintering conditions (sintering atmosphere and temperature) as indicated in the table. In Example [B], the sintering was effected at 900° C. in a non-oxidizing atmosphere. In Example [C], the sintering was effected at 800° C. in an oxidizing atmosphere. In Example [D], the sintering was effected at 700° C. in an oxidizing atmosphere. The sintering time in Examples [B], [C] and [D] was three hours as in Example [A].

It will be understood from TABLE 1 that the adsorbent body 10 exhibited an extremely large specific surface area of about 70–80 $m^2$/g, namely, an extremely high adsorption ability, where the sintering was effected in the non-oxidizing atmosphere in the closed vessel (Example [B]) or at a sintering temperature of about 700° C. (Example [D]). It will also be understood that the sintering in the non-oxidizing atmosphere enabled the adsorbent body 10 to have an extremely high collapse strength of 8.0 kg.

The porous structure of the adsorbent body 10 according to the present invention, which includes the activated carbon 14, has a high porosity owing to an enormous number of the fine pores 12 formed within the activated carbon 14, and therefore exhibits an accordingly high adsorption ability or performance. Further, the adsorbent body 15 has a high collapse strength (mechanical strength) owing to firm bonding of the grains of the activated carbon 14 by the inorganic binder which is derived from the "Honyama" clay (silica.alumina clay mineral). This collapse strength of the adsorbent body 15 is a drastic improvement over that of an adsorbent body which is produced without an inorganic binder. Thus, the present adsorbent body 15 has a sufficiently high adsorption ability while maintaining a sufficiently high mechanical strength.

The porous structure of the adsorbent body 15 also includes the activated alumina 18 which is highly adsorbent to an adsorbate different from the adsorbate to which the activated carbon 14 is highly adsorbent. Thus, the adsorbent body 10 has two groups of adsorption sites for efficiently adsorbing two different adsorbates, which may be contained in a subject fluid to be subjected to separation or refinement operation by a suitable device using the present adsorbent body 10. Therefore, the device may be simplified and is available at a reduced cost using the adsorbent bodies 10 of the same kind which include the activated carbon 14 and activated alumina 18. The activated alumina 18 has a considerably low mechanical strength and tends to lower the overall mechanical strength of the adsorbent body which also includes activated carbon 14, if the inorganic binder would not be included in the adsorbent body 10. However, the inorganic binder used according to the present invention effectively bonds together the grains of the activated alumina 18 as well as the grains of the activated carbon 14, and assures a sufficiently high overall mechanical strength of the adsorbent body 10, which is highly capable of adsorbing two different adsorbates corresponding to the activated carbon and alumina 14, 18.

The activated alumina 18 is produced in the manner described below.

Figure 4:
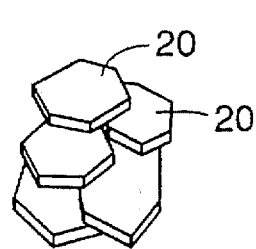
FIGS. 4(a) and 4(b) are views for explaining the formation of the activated alumina, FIG. 4(a) showing the crystals of aluminum hydroxide, and FIG. 4(b) showing fine alumina crystals produced by disintegration of the aluminum hydroxide crystals.
Figure 4:
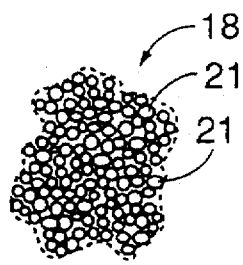
Figure 5:
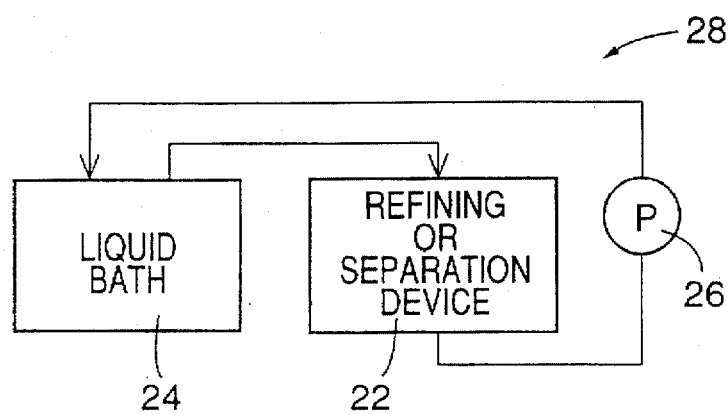
FIG. 5 is a view for explaining a method of measuring a decoloring power of the adsorbent body with respect to Methylene Blue.

Crystals 20 of aluminum hydroxide [Al(OH)$_3$] have a hexagonal plate form as indicated in FIG. 4(a). The aluminum hydroxide included in the raw material composition as the source material for the activated alumina 18 as explained above takes the form of the crystals 20 indicated in FIG. 4(a). Described more specifically, the powdered aluminum hydroxide has an average grain size of about 30–50 µm, each grain being an aggregate of the crystals 20 superposed on each other. In the firing or sintering step described above, the crystals 20 of each aggregate are disintegrated into fine or minute alumina crystals 21 as indicated in FIG. 4(b), while maintaining the original shape or profile of the aggregate as indicated by broken line in FIG. 4(b). There are left minute gaps between the adjacent fine alumina crystals 21, which define the fine pores 16. Thus, the activated alumina 18 having the multiple fine pores 16 is produced as indicated in FIG. 2(b). If the activated alumina 18 was sintered at a higher temperature, the alumina crystals 21 would be bonded together and grow into larger crystals, and the pores 16 would disappear, causing a decrease in the specific surface area.

The inorganic binder for bonding together the grains of the activated carbon 14 and the activated alumina 18 is partly derived from the "Honyama" clay, which is a silica.alumina clay mineral. Since the sintering temperature is lower than 1000° C., the inorganic binder remains as a porous structure in the sintered adsorbent body 10, and therefore the adsorbent body 10 has a higher adsorption ability than an adsorbent body produced by using a glass binder or similar inorganic binder which does not contribute to the adsorption ability.

It is also significant to note that the malt ash includes a comparatively large amount of phosphorus pentaoxide, which functions as part of the inorganic binder. That is the phosphorus pentaoxide included in the malt ash cooperates with the inorganic binder components included in the "Honyama" clay, to effectively bond together the grains of the activated carbon and alumina 14, 18, enabling the adsorbent body 10 to provide a comparatively high collapse strength at a comparatively low sintering temperature of the unfired shaped body. The comparatively low sintering temperature means a comparatively small loss of the adsorption ability due to the sintering.

As described above, the raw material composition for the adsorbent body 10 includes a malt ash as the source materials for the activated carbon 14 and inorganic binder, aluminum hydroxide as the source material for the activated alumina 18, and "Honyama" clay as the source material for the inorganic binder. When the unfired shaped body of the raw material composition is heated to a given temperature during the firing process, aluminum hydroxide is thermally decomposed into the activated alumina 18, while at the same time the carbon (activated carbon or amorphous carbon) included in the shaped body (i.e., in the malt ash and forming aids) is activated by a water vapor generated by the thermal decomposition of the aluminum hydroxide, whereby the number of the fine pores 12 formed in the activated carbon 14 is increased to further improve the adsorption ability of the fired adsorbent body 10.

In Example [B] wherein the unfired shaped body was sintered in the non-oxidizing atmosphere (whose oxygen concentration is substantially zero) in the closed vessel, a larger amount of carbon (activated carbon) was left in the adsorbent body 10 than in the adsorbent body 10 according to Example [A], even though the sintering was effected at the same sintering temperature in Examples [A] and [B]. Accordingly, the adsorbent body 10 according to Example [B] has a comparatively large specific surface area, as is apparent from TABLE 1.

In Examples [A], [C] and [D], the sintering was effected in the same condition (in the oxidizing atmosphere), except for the use of different sintering Temperatures. Consequently, the adsorbent bodies 10 according to these Examples all include a relatively small amount of carbon and have substantially the same compositions. These adsorbent bodies 10 have different specific surface areas. This difference appears to be caused by the different sintering temperatures. Namely, the annealing effect on the surface of the activated alumina 18 is considered to increase with an increase in the sintering temperature, and the surface area of the activated alumina 18 is presumed to decrease with the increase in the sintering temperature. It is noted that α-alumina having a high bonding force or power will not be produced from the activated alumina 18 at a sintering temperature within a range between 700° C. and 900° C. In this range of the sintering temperature, the mechanical strength of the activated alumina 18 will not substantially change, although the surface area of the activated alumina 18 decreases with the sintering temperature.

The sintering temperatures employed in Examples [A] through [D] are all within a preferable range of 500°–1000°

C., which assures permits the adsorbent body 10 to have a sufficient mechanical strength owing to the bonding of the grains of the activated carbon and alumina 14, 18 by the inorganic binder, with the activated carbon 14 left in a relatively large amount, and with the activated alumina 18 produced from aluminum hydroxide without generation of α-alumina.

In the above examples wherein the malt ash was used as the source material for the activated carbon 14, a large number of fine pores 12 were formed in the activated carbon 14 owing to the composition of the malt ash, whereby the adsorbent body 10 is given an excellent adsorption ability depending upon the fine pores 12. The malt ash is obtained by incinerating a beer-cake produced in the production of beer, which an industrial waste. Therefore, the use of the malt ash is desirable for disposal of the industrial waste, saving of the resources, and improvement of the environment.

The malt ash includes a comparatively large amount (about 24 wt. %) of carbon and a comparatively large amount (about 23 wt. %) of phosphorus pentaoxide. The carbon included in the malt ash gives the raw material composition a sufficient amount of carbon. Further, the malt ash gives the raw material composition phosphorus pentaoxide and also functions as part of the inorganic binder for bonding the grains of the activated carbon and alumina 14, 18. The use of phosphorus pentaoxide in the form of the malt ash is advantageous over the use of phosphorus pentaoxide in an aqueous solution as in the conventional phosphate curing process. While phosphorus pentaoxide in the conventional phosphate curing process tends to be rapidly cured with a rapid reaction, phosphorus pentaoxide provided by the malt ash according to the present invention only slowly reacts with other components or constituents of the inorganic binder. In this respect, the production process of the adsorbent body can be easily controlled according to the present invention. Described more specifically, the phosphorus pentaoxide included in the malt ash has already reacted with various other inorganic components such as $SiO_2$, CaO and MgO also included in the malt ash, upon incineration or combustion of beer-cake to produce the malt ash. This is considered to be a reason for slow reaction of the phosphorus pentaoxide included in the malt ash with the other inorganic binder components. Therefore, an economically desirable extrusion process may be applied to the raw material composition to form an unfired shaped body for the adsorbent body 10, even though the raw material composition includes phosphorus pentaoxide (which generally makes it difficult to employ the extrusion process).

While the present invention has been described above in its presently preferred embodiment by reference to the accompanying drawings, it is to be understood that the invention is not limited to the details of the illustrated embodiment and examples, but may be otherwise embodied.

The adsorbent body 10 in the illustrated embodiment takes the form of a Raschig ring, the adsorbent body according to the invention may take any other forms or configuration such as prisms and cylinder, and even a honeycomb configuration depending upon a specific application.

While the illustrated examples used "Honyama" clay, aluminum hydroxide and malt ash for the raw material composition, the constituents of the raw material composition may be suitable changed. For instance, the "Honyama" clay may be replaced by any other inorganic binder source, such as various clays other than the "Honyama" clay, and a mixture of powdered alumina, silica or magnesia. The raw material composition used in the illustrated examples includes aluminum hydroxide for the activated alumina 18, it may include already activated alumina. Where the adsorbent body 10 does not include activated alumina 18, the raw material composition need not include aluminum hydroxide. Further, the malt ash used for the source material for the activated carbon 14 in the illustrated examples may be replaced by ashes of other plants and/or wood (trees), such as ashes of grains (other than the malt ash) which include a relatively large amount of phosphorus pentaoxide. The ash may be replaced by amorphous carbon derived from charcoal or coke. In this case, the adsorbent body 10 does not include phosphorus pentaoxide, but satisfies the principle of the invention. If it is desired to have the adsorbent body 10 including phosphorus pentaoxide in the above case, phosphorus pentaoxide may be added to the raw material composition, separately from the source material for the activated carbon 14.

The extrusion process employed to prepare an unfired shaped body or precursor of the adsorbent body 10 in the illustrated examples may be replaced by other forming or molding processes such as press forming and casting. Where phosphorus pentaoxide is added separately from the source material for the activated carbon as indicated above, a casting process is advantageously used.

Although cellulose caking additive, wax emulsion and deflocculating agent were used as the forming and/or bonding aids in the illustrated examples, other forming aids such as dextrin may be used. It is noted that the forming or bonding aids which are organic compounds also serve as part of the source material for the activated carbon 14, as described above with respect to the illustrated embodiment. In this respect, the use of organic forming and/or bonding aids is desirable.

It is also noted that the drying and sintering conditions of the unfired shaped body may be suitable modified. While the sintering in a non-oxidizing atmosphere at about 900° C. is preferable as in Example [B], the sintering may be effected in an oxidizing atmosphere as in Example [A]. The sintering temperature may be suitably selected within a range of 500°–1000° C., as indicated above. If the oxygen concentration of the sintering atmosphere is substantially zero or relatively low, the sintering is preferably effected in an air-tightly closed Vessel as in Examples [B], but may be effected by first evacuating a sintering device or vessel and heating the unfired shaped body while introducing a nitrogen gas into the sintering device.

It is to be understood that the present invention may be embodied with various other changes, modifications and improvements, which may occur to those skilled in the art, without departing from the spirit and scope of the invention defined in the following claims.

What is claimed is:

1. An adsorbent body having a porous structure for purifying a fluid, wherein said porous structure comprises activated carbon, activated alumina, and an inorganic binder for bonding together grains of said activated carbon and said activated alumina, wherein said inorganic binder includes phosphorous pentaoxide, and wherein said porous structure comprises 5–40 wt. % of said activated carbon, 10–40 wt. % of said activated alumina, and 1–15 wt. % of said phosphorous pentaoxide.

2. An adsorbent body according to claim 1, wherein said inorganic binder includes a clay mineral.

3. A method of producing an adsorbent body having a porous structure for purifying a fluid, said method comprising the steps of:

preparing a raw material composition including a source material which gives activated carbon, aluminum hydroxide which gives activated alumina, and an inorganic binder for bonding together grains of said activated carbon and said alumina, said raw material composition including 15–70 wt % of said aluminum hydroxide, said inorganic binder including phosphorous pentoxide;

forming an unfired shaped body of said raw material composition; and firing said unfired shaped body at a predetermined sintering temperature to produce said adsorbent body having a porous structure comprising said activated carbon, said activated alumina, and said inorganic binder.

4. A method according to claim 3, wherein said step of firing said unfired shaped body comprises firing said unfired shaped body at a temperature of 500°–1000° C. in an atmosphere whose oxygen concentration is substantially zero.

5. A method according to claim 3, wherein said source material which gives activated carbon comprises an ash of plant and/or wood which includes carbon.

6. A method of producing an adsorbent body having a porous structure for purifying a fluid, said method comprising the steps of:

preparing a raw material composition including a source material which gives activated carbon, aluminum hydroxide which gives activated alumina, and an inorganic binder for bonding together grains of said activated carbon and said activated alumina, said source material comprising an ash of plant and/or wood, wherein said ash of plant and/or wood comprises 10–30 wt. % of carbon and 10–40 wt. % of phosphorous pentoxide;

forming an unfired shaped body of said raw material composition; and firing said unfired shaped body at a predetermined sintering temperature to produce said adsorbent body having a porous structure comprising said activated carbon, said activated alumina, and said inorganic binder.

7. A method according to claim 6, wherein said source material comprises 4–70 wt. % of said ash of plant and/or wood per 100 wt. % of said raw material composition.

8. A method according to claim 6, wherein said ash of plant and/or wood comprises an ash of grains.

9. A method according to claim 8, wherein said ash of grains includes a malt ash.

10. A method according to claim 9, wherein said malt ash comprises 10–30 wt. % of carbon (C), 30–50 wt. % of silicon dioxide ($SiO_2$), 1–3 wt. % of di-iron trioxide ($Fe_2O_3$), 3–8 wt. % of calcium oxide (CaO), 5–10 wt. % of magnesium oxide (MgO), 1–5 wt. % of potassium oxide ($K_2O$), and 10–40 wt. % of phosphorus pentaoxide ($P_2O_5$).

11. A method according to claim 6, wherein said step of preparing a raw material composition comprises including in said raw material composition 15–70 wt. % of said aluminum hydroxide.

* * * * *